US009903302B2

(12) United States Patent
Kitagawa (10) Patent No.: US 9,903,302 B2
(45) Date of Patent: Feb. 27, 2018

(54) CONTROL DEVICE FOR INTERNAL COMBUSTION ENGINE (71) Applicant: TOYOTA JIDOSHA KABUSHIKI KAISHA, Toyota-shi, Aichi-ken (JP)

(72) Inventor: Eiki Kitagawa, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 63 days.

(21) Appl. No.: 15/184,237

(22) Filed: Jun. 16, 2016

(65) Prior Publication Data
US 2016/0369727 A1 Dec. 22, 2016

(30) Foreign Application Priority Data
Jun. 18, 2015 (JP) .................. 2015-122717

(51) Int. Cl.
*F02D 35/00* (2006.01)
*F02D 41/30* (2006.01)
(Continued)

(52) U.S. Cl.
CPC .......... *F02D 41/30* (2013.01); *F02D 35/023* (2013.01); *F02D 35/028* (2013.01); *F02D 37/02* (2013.01); *F02D 41/2448* (2013.01); *F02D 41/40* (2013.01); *F02P 5/153* (2013.01); *F02D 2041/1418* (2013.01);
(Continued)

(58) Field of Classification Search
CPC .... F02D 35/023; F02D 35/024; F02D 35/028; F02D 41/30; F02D 41/3064; F02D 2041/1423; F02D 2041/286

USPC .......... 701/101, 111; 123/435, 436
See application file for complete search history.

(56) References Cited

U.S. PATENT DOCUMENTS

2005/0039721 A1\* 2/2005 Truscott ............... F02D 35/023
123/406.22
2008/0319632 A1 12/2008 Miyashita et al.
(Continued)

FOREIGN PATENT DOCUMENTS

| JP | 2008-069713 A | 3/2008 |
|---|---|---|
| JP | 2016-151220 A | 8/2016 |
| WO | 2016/113787 A1 | 7/2016 |

*Primary Examiner* — Thomas Moulis
(74) *Attorney, Agent, or Firm* — Andrews Kurth Kenyon LLP (57) ABSTRACT

Feedback control is executed based on a measured CA10 and a measured CA50 that are calculated based on measured data for MFB. During steady operation a correlation index value $I_{RA}$ that shows a degree of correlation between the measured data and reference data corresponding thereto is calculated. During transient operation, a correlation index value $I_{AA}$ that shows a degree of correlation between the measured data and measured data that is measured immediately prior to the measured data is calculated. If the correlation index value $I_{RA}$ or the correlation index value $I_{AA}$ is less than a determination value $I_{th}$, control is performed to prohibit reflection in the aforementioned feedback control of each of the measured CA10 and the measured CA50 which are measured in the combustion cycle in which the relevant correlation index value is calculated.

4 Claims, 7 Drawing Sheets

(51) Int. Cl.
*F02D 41/24* (2006.01)
*F02D 41/40* (2006.01)
*F02P 5/153* (2006.01)
*F02D 35/02* (2006.01)
*F02D 37/02* (2006.01)
F02D 41/14 (2006.01)
F02D 41/28 (2006.01)
F02D 41/38 (2006.01)

(52) U.S. Cl.
CPC ... *F02D 2041/281* (2013.01); *F02D 2041/286* (2013.01); *F02D 2041/389* (2013.01); *Y02T 10/44* (2013.01); *Y02T 10/46* (2013.01)

(56) References Cited

U.S. PATENT DOCUMENTS

| | | | | |
|---|---|---|---|---|
| 2010/0241333 | A1* | 9/2010 | Moriya | F02D 11/10 |
| | | | | 701/101 |
| 2011/0106399 | A1* | 5/2011 | Asano | F02D 35/02 |
| | | | | 701/102 |
| 2011/0276251 | A1* | 11/2011 | Kang | B60K 6/48 |
| | | | | 701/103 |
| 2013/0024089 | A1* | 1/2013 | Wang | F02D 41/1462 |
| | | | | 701/102 |
| 2013/0080026 | A1* | 3/2013 | Kang | F02D 13/0207 |
| | | | | 701/102 |
| 2013/0213352 | A1* | 8/2013 | Kumar | F02D 41/401 |
| | | | | 123/406.23 |
| 2016/0377043 | A1* | 12/2016 | Wang | G05B 15/02 |
| | | | | 701/111 |

* cited by examiner

100: ACQUIRE OPERATING CONDITIONS
102: DURING LEAN-BURN OPERATION?
104: DURING STEADY OPERATION?
106: CALCULATE REFERENCE DATA FOR MFB
108: CALCULATE MEASURED DATA FOR MFB
110: CALCULATE CORRELATION INDEX VALUE $I_{RA}$
112: CALCULATE CURRENT DATA
114: CALCULATE IMMEDIATELY PRECEDING PAST DATA
116: CALCULATE CORRELATION INDEX VALUE $I_{AA}$
118: $I_{RA}$ or $I_{AA} < I_{th}$?
120: DETERMINE THERE IS NO NOISE
122 STOP SA-CA10 & CA50 FEEDBACK CONTROL

Fig. 10

CONTROL DEVICE FOR INTERNAL COMBUSTION ENGINE

CROSS-REFERENCE TO RELATED APPLICATION

The present application claims priority to Japanese Patent Application No. 2015-122717 filed on Jun. 18, 2015, which is incorporated herein by reference in its entirety.

BACKGROUND

Technical Field

Preferred embodiments relate to a control device for an internal combustion engine, and more particularly to a control device for an internal combustion engine that is suitable as a device for controlling an internal combustion engine that includes an in-cylinder pressure sensor.

Background Art

For example, JP 2008-069713 A discloses a combustion control device for an internal combustion engine that includes an in-cylinder pressure sensor. In the aforementioned combustion control device, data for mass fraction burned (hereunder, also referred to as "MFB") is calculated in synchrony with the crank angle using an in-cylinder pressure sensor and a crank angle sensor, and an actual combustion starting point and a combustion center of gravity point are calculated based on the data. Furthermore, if a difference obtained by subtracting the actual combustion starting point from the combustion center of gravity point exceeds an upper limit, the combustion control device determines that combustion has deteriorated, and implements a countermeasure for improving combustion, such as increasing the fuel injection amount. Note that, in Patent Literature 1, as one example, an appropriate value during a period in which MFB is from 10 to 30 percent is used as the aforementioned actual combustion starting point that is a crank angle at a time that combustion is actually started in a cylinder, and, for example, an appropriate value during a period in which MFB is from 40 to 60 percent is used as the combustion center of gravity point.

LIST OF RELATED ART

Following is a list of patent documents which the applicant has noticed as related arts of the present application.
Patent Literature 1: JP 2008-069713 A

SUMMARY

Noise is superimposed on an output signal of an in-cylinder pressure sensor due to various factors. In a case of performing engine control based on a crank angle when MFB becomes a specified fraction (hereunder, referred to as "specified fraction combustion point") as described in Patent Literature 1, the specified fraction combustion point is calculated based on measured data for MFB. When noise is superimposed on an output signal of the in-cylinder pressure sensor, noise is also superimposed on the measured data for MFB that is based on measured data for the in-cylinder pressure. Consequently, an error that is caused by noise can arise with respect to a specified fraction combustion point that is utilized for engine control. If engine control based on a specified fraction combustion point is performed without giving any particular consideration to such noise, there is a possibility that the accuracy of the relevant engine control will deteriorate. Therefore, in the case of perform engine control based on a specified fraction combustion point, it is necessary to adopt a configuration that can appropriately detect that noise is superimposed on measured data for MFB, and to also ensure that an appropriate countermeasure is implemented if noise is detected.

With respect to detection of noise as described above, the present inventors have already studied a determination method that is based on a correlation index value that shows a degree of correlation between measured data for MFB and reference data for MFB that is based on the operating conditions of the relevant internal combustion engine, and have obtained confirmation that the determination method is effective. However, according to further studies of the present inventors, it was revealed that cases in which the determination method is effective are limited to cases in which the operating conditions of the internal combustion engine are steady. That is, when the operating conditions of the internal combustion engine are transient, a divergence between measured data for MFB and reference data for MFB is liable to become large, and consequently there is a risk of the detection of noise being erroneously determined, irrespective of the fact that noise is not actually superimposed on the measured data for MFB.

Preferred embodiments address the above-described problem and have an object to provide a control device for an internal combustion engine that is configured to be capable of detecting noise that is superimposed on measured data for MFB which is calculated based on the output of an in-cylinder pressure sensor, and suppressing an error at a specified fraction combustion point that is due to the noise being reflected as it is in engine control, without being affected by operating conditions of the internal combustion engine.

A control device for an internal combustion engine according to the preferred embodiments include an in-cylinder pressure sensor, a crank angle sensor, and a control unit. The in-cylinder pressure sensor is configured to detect an in-cylinder pressure. The crank angle sensor is configured to detect a crank angle. The control unit is configured to: calculate measured data for mass fraction burned that is synchronized with a crank angle, based on an in-cylinder pressure that is detected by the in-cylinder pressure sensor and a crank angle that is detected by the crank angle sensor; execute engine control in which a measured value at a specified fraction combustion point that is a crank angle at a time that mass fraction burned becomes a specified fraction is calculated based on measured data for mass fraction burned and an actuator of the internal combustion engine is controlled based on the measured value at the specified fraction combustion point; when operating conditions of the internal combustion engine are transient, calculate a correlation index value showing a degree of correlation between current data of the measured data for mass fraction burned and immediately preceding past data relative to the current data as a transition-time index value; and when the operating conditions are non-transient, calculate a correlation index value showing a degree of correlation between the current data and reference data for mass fraction burned that is based on the operating conditions as a non-transition-time index value.

The control unit is also configured to: when the transition-time index value is less than a determination value therefor, prohibit reflection of a measured value at a specified fraction combustion point in a combustion cycle in which the current data for mass fraction burned is calculated in the engine control, or lower a degree to which the measured value is reflected in the engine control in comparison to a case where the transition-time index value is equal to or greater than a determination value therefor; and when the non-transition-time index value is less than a determination value therefor, prohibit reflection of a measured value at a specified fraction combustion point in a combustion cycle in which the current data for mass fraction burned is calculated in the engine control, or lower a degree to which the measured value is reflected in the engine control in comparison to a case where the non-transition-time index value is equal to or greater than a determination value therefor.

The control unit may also be configured to calculate the transition-time index value by using measured data for mass fraction burned that is calculated in a combustion cycle of a same cylinder that is one cycle prior to a combustion cycle in which the current data for mass fraction burned is calculated as the immediately preceding past data.

When the in-cylinder pressure sensor is configured to detect an in-cylinder pressure for each cylinder of a plurality of cylinders, the control unit may also be configured to calculate the transition-time index value by using measured data for mass fraction burned that is calculated in a combustion cycle of another cylinder during a period from a combustion cycle of a same cylinder that is one cycle prior to a combustion cycle in which the current data for mass fraction burned is calculated until a combustion cycle in which the current data for mass fraction burned is calculated as the immediately preceding past data. In this case, the other cylinder may be a cylinder that, in a firing order, is positioned one place before a cylinder in whose combustion cycle the current data for mass fraction burned is calculated.

According to the control device according to the preferred embodiments, when operating conditions of an internal combustion engine are transient, a correlation index value (transition-time index value) is calculated that shows a degree of correlation between current data of measured data for mass fraction burned and immediately preceding past data relative to the current data. Further, when operating conditions of an internal combustion engine are non-transient, a correlation index value (non-transition-time index value) is calculated that shows a degree of correlation between current data of measured data for mass fraction burned and reference data for mass fraction burned that is based on the relevant operating conditions. Hence, a correlation index value can be calculated without being affected by operating conditions of the internal combustion engine. In this case, if noise is superimposed on measured data for mass fraction burned, the aforementioned correlation index value decreases (indicates that the degree of correlation is low). Thus, according to the control device according to the preferred embodiments, noise that is superimposed on measured data for mass fraction burned can be detected. Furthermore, according to the control device according to the preferred embodiments, when a transition-time index value is less than a determination value therefor, reflection of a measured value at a specified fraction combustion point in a combustion cycle in which the current data for mass fraction burned is calculated in engine control is prohibited, or a degree to which the measured value is reflected in the engine control is lowered in comparison to a case where the transition-time index value is equal to or greater than a determination value therefor. When a non-transition-time index value is less than a determination value therefor, reflection of a measured value at a specified fraction combustion point in a combustion cycle in which the current data for mass fraction burned is calculated in engine control is prohibited, or a degree to which the measured value is reflected in the engine control is lowered in comparison to a case where the non-transition-time index value is equal to or greater than a determination value therefor. By this means, it is possible to suppress the occurrence of a situation in which an error at a specified fraction combustion point that is caused by noise is reflected as it is in engine control.

DETAILED DESCRIPTION

An embodiment of the present invention is described hereunder referring to FIG. 1 to FIG. 10.

[System Configuration of Embodiment]

Figure 1:
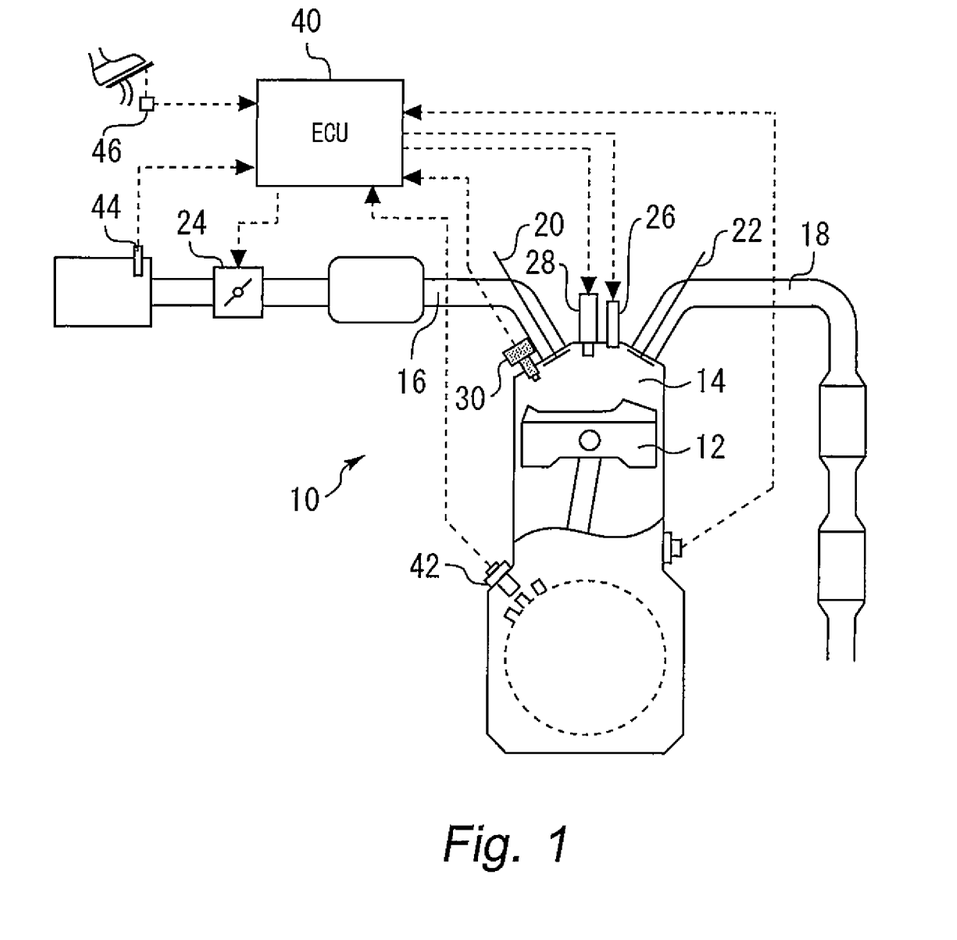
FIG. 1 is a view for describing a system configuration in an embodiment of the present invention.
Figure 2:
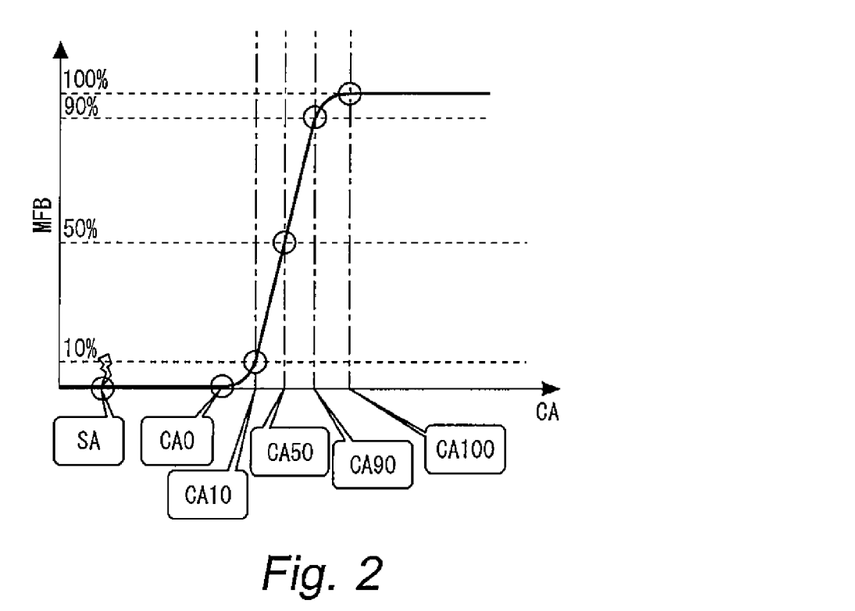
FIG. 2 is a view illustrating a waveform of MFB data.

FIG. 1 is a view for describing the system configuration of an embodiment of the present invention. The system illustrated in FIG. 1 includes a spark-ignition type internal combustion engine 10. The internal combustion engine 10 includes a plurality of cylinders, and one of the cylinders is illustrated in FIG. 1. A piston 12 is provided in each cylinder of the internal combustion engine 10. A combustion chamber 14 is formed at the top side of the piston 12 inside the respective cylinders. An intake passage 16 and an exhaust passage 18 communicate with the combustion chamber 14.

An intake valve 20 is provided in an intake port of the intake passage 16. The intake valve 20 opens and closes the intake port. An exhaust valve 22 is provided in an exhaust port of the exhaust passage 18. The exhaust valve 22 opens and closes the exhaust port. An electronically controlled throttle valve 24 is provided in the intake passage 16. Each cylinder of the internal combustion engine 10 is provided with a fuel injection valve 26 for injecting fuel directly into the combustion chamber 14 (into the cylinder), and an ignition device (only a spark plug is illustrated in the drawings) 28 for igniting an air-fuel mixture. An in-cylinder pressure sensor 30 for detecting an in-cylinder pressure is also mounted in each cylinder.

The system illustrated in FIG. 1 also includes an ECU (electronic control unit) 40 as a control device that controls the internal combustion engine 10, and drive circuits (not shown in the drawings) for driving various actuators that are described below, and also various sensors that are described below and the like. The ECU 40 includes an input/output interface, a memory, and a central processing unit (CPU). The input/output interface is provided in order to take in sensor signals from various sensors installed in the internal combustion engine 10 or the vehicle in which the internal combustion engine 10 is mounted, and to output actuating signals to various actuators for controlling the internal combustion engine 10. Various control programs and maps and the like for controlling the internal combustion engine 10 are stored in the memory. The CPU reads out a control program or the like from the memory and executes the control program or the like, and generates actuating signals for various actuators based on sensor signals that are taken in.

The sensors from which the ECU 40 takes in signals include, in addition to the aforementioned in-cylinder pressure sensor 30, various sensors for acquiring the engine operating state such as a crank angle sensor 42 that is disposed in the vicinity of a crank shaft (not illustrated in the drawings), an air flow meter 44 that is disposed in the vicinity of an inlet to the intake passage 16, and an accelerator opening degree sensor 46 for detecting an opening degree of an accelerator pedal.

The actuators to which the ECU 40 outputs actuating signals include various actuators for controlling operation of the engine such as the above described throttle valve 24, fuel injection valve 26 and ignition device 28. The ECU 40 also has a function that synchronizes an output signal of the in-cylinder pressure sensor 30 with a crank angle, and subjects the synchronized signal to A/D conversion and acquires the resultant signal. It is thereby possible to detect an in-cylinder pressure at an arbitrary crank angle timing in a range allowed by the AD conversion resolution. In addition, the ECU 40 stores a map in which the relation between a crank angle and an in-cylinder volume is defined, and can refer to the map to calculate an in-cylinder volume that corresponds to a crank angle.

[Combustion Control in Embodiment]
(Calculation of Measured Data for MFB Utilizing in-Cylinder Pressure Sensor)

According to the system of the present embodiment that includes the in-cylinder pressure sensor 30 and the crank angle sensor 42, in each cycle of the internal combustion engine 10, measured data for an in-cylinder pressure P can be acquired in synchrony with a crank angle (more specifically, a set of in-cylinder pressures P that are calculated as values for each predetermined crank angle). A heat release amount Q inside a cylinder at an arbitrary crank angle θ can be calculated according to the following equations (1) and (2) using the measured data for the in-cylinder pressure P that is obtained and the first law of thermodynamics. Furthermore, MFB at an arbitrary crank angle θ can be calculated in accordance with the following equation (3) using the measured data for the heat release amount Q inside a cylinder that is calculated (set of heat release amounts Q calculated as values for each predetermined crank angle). Further, measured data for MFB (measured MFB set) that is synchronized with the crank angle can be calculated by executing processing to calculate the MFB at each predetermined crank angle. The measured data for MFB is calculated in a combustion period and in a predetermined crank angle period before and after the combustion period (in this case, as one example, a crank angle period from a closing timing IVC of the intake valve 20 to an opening timing EVO of the exhaust valve 22).

[Expression 1]

$$dQ/d\theta = \frac{1}{\kappa - 1} \times \left(V \times \frac{dP}{d\theta} + P \times \kappa \times \frac{dV}{d\theta}\right) \quad (1)$$

$$Q = \sum \frac{dQ}{d\theta} \quad (2)$$

$$MFB = \frac{Q(\theta) - Q(\theta_{min})}{Q(\theta_{max}) - Q(\theta_{min})} \times 100 \quad (3)$$

Where, in the above equation (1), V represents an in-cylinder volume and κ represents a ratio of specific heat of in-cylinder gas. Further, in the above equation (3), $\theta_{min}$ represents a combustion starting point and $\theta_{max}$ represents a combustion end point.

According to the measured data for MFB that is calculated by the above method, a crank angle at a time that MFB is a specified fraction a (%) (hereunder, referred to as "specified fraction combustion point CAα") can be acquired. Note that, when acquiring the specified fraction combustion point CAα, although it is also possible for a value of the specified fraction a to be successfully included in the measured data for MFB, when the value is not included, the specified fraction combustion point CAα can be calculated by interpolation based on measured data located on both sides of the specified fraction a. Hereunder, in the present description, a value of CAα that is acquired utilizing measured data for MFB is referred to as "measured CAα". A typical specified fraction combustion point CA will now be described referring to FIG. 2 that illustrates a waveform of MFB data. Combustion in a cylinder starts accompanying an ignition delay after ignition of an air-fuel mixture is performed at an ignition timing SA. A starting point of the combustion ($\theta_{min}$ in the above described equation (3)), that is, a crank angle at a time that MFB starts to rise is referred to as "CA0". A crank angle period (CA0 to CA10) from CA0 until a crank angle CA10 that is a time that MFB becomes 10% corresponds to an initial combustion period, and a crank angle period (CA10 to CA90) from CA10 until a crank angle CA90 that is a time that MFB becomes 90% corresponds to a main combustion period. Further, according to the present embodiment, a crank angle CA50 that is a time that MFB becomes 50% is used as a combustion center of gravity point. A crank angle CA100 that is a time that MFB becomes 100% corresponds to a combustion end point ($\theta_{max}$ in the above described equation (3)) at which the heat release amount Q reaches a maximum value. The combustion period is defined as a crank angle period from CA0 to CA100.

(Engine Control Utilizing CAα)

Figure 3:
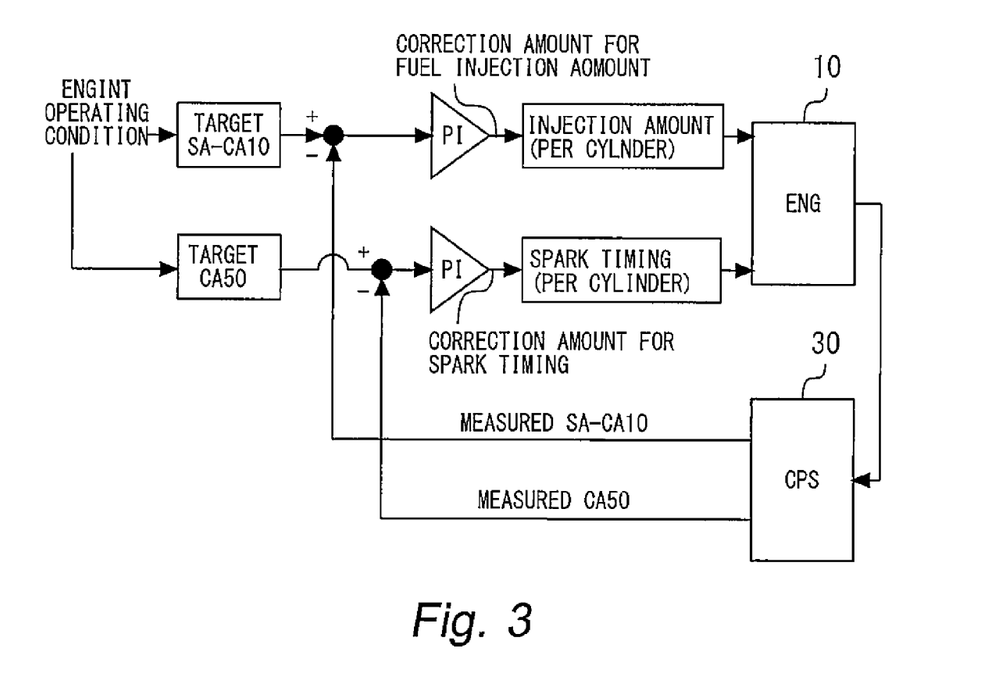
FIG. 3 is a block diagram for describing an outline of two types of feedback control utilizing CA10 and CA50 that an ECU executes.

FIG. 3 is a block diagram for describing an outline of two types of feedback control utilizing CA10 and CA50 that the ECU 40 executes. The engine control that the ECU 40 performs includes control utilizing the specified fraction combustion point CAα. Here, as examples of engine control utilizing the specified fraction combustion point CAα, two types of feedback control that utilize CA10 and CA50, respectively, will be described. According to the present embodiment, these controls are executed during lean-burn operation that is performed at a larger (leaner combustion) air-fuel ratio than the theoretical air-fuel ratio.

1. Feedback Control of Fuel Injection Amount Utilizing SA-CA10

In this feedback control, CA10 that is the 10% combustion point is not taken as a direct target value, but is instead utilized as follows. That is, in the present description, a crank angle period from the ignition timing SA to CA10 is referred to as "SA-CA10". More specifically, SA-CA10 that is a difference obtained by subtracting the ignition timing SA from the measured CA10 is referred to as "measured SA-CA10". Note that, according to the present embodiment, a final target ignition timing (indicated value of ignition timing in next cycle) after adjustment by feedback control of the ignition timing utilizing CA50 as described later is used as the ignition timing SA that is used for calculating the measured SA-CA10.

Figure 4:
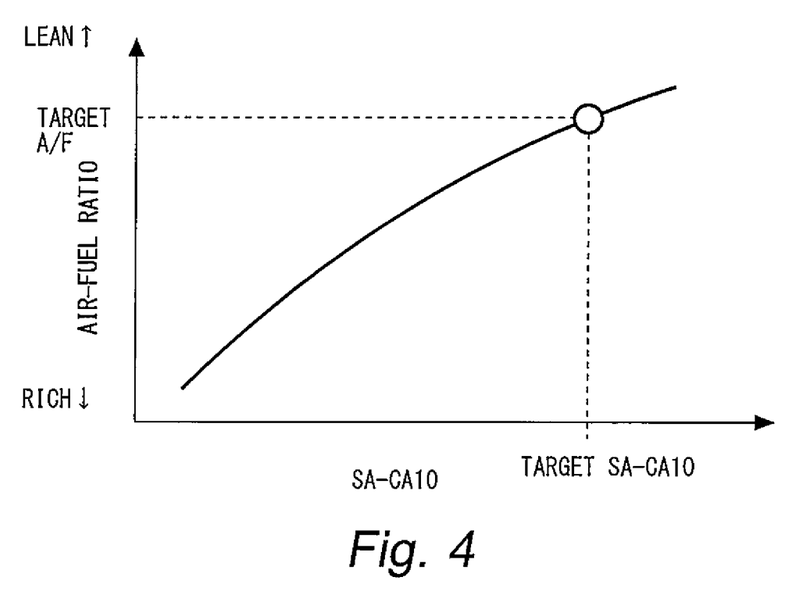
FIG. 4 is a view that represents a relation between an air-fuel ratio and SA-CA10.

FIG. 4 is a view that represents a relation between the air-fuel ratio and SA-CA10. This relation is a relation is in a lean air-fuel ratio region that is on a lean side relative to the theoretical air-fuel ratio, and is a relation under identical operating conditions (more specifically, engine operating conditions in which the intake air amount and engine speed are identical). SA-CA10 is a parameter that represents an ignition delay, and there is a constant correlation between SA-CA10 and the air-fuel ratio. More specifically, as shown in FIG. 4, in the lean air-fuel ratio region, there is a relation that SA-CA10 increases as the air-fuel ratio becomes leaner. Therefore, a target SA-CA10 that corresponds to a desired target air-fuel ratio can be determined by utilizing this relation. In addition, according to the present embodiment a configuration is adopted so that, during lean-burn operation, feedback control is executed that adjusts a fuel injection amount so that the measured SA-CA10 comes close to the target SA-CA10 (hereunder, referred to simply as "SA-CA10 feedback control").

As shown in FIG. 3, in the SA-CA10 feedback control the target SA-CA10 is set in accordance with the engine operating conditions (more specifically, the target air-fuel ratio, the engine speed and the intake air amount). The measured SA-CA10 is calculated for each cycle in the respective cylinders. Further, in the SA-CA10 feedback control, as one example, PI control is used to adjust the fuel injection amount so that a difference between the target SA-CA10 and the measured SA-CA10 is eliminated. In the PI control, using a difference between the target SA-CA10 and the measured SA-CA10 as well as a predetermined PI gain (proportional gain and integral gain), a correction amount for the fuel injection amount is calculated in accordance with the relevant difference and the size of an integrated value thereof. A correction amount that is calculated for each cylinder is reflected in the basic fuel injection amount of the cylinder that is the object of adjustment. In this way, the fuel injection amount to be supplied in the next cycle at the relevant cylinder is adjusted (corrected) by the SA-CA10 feedback control.

According to the SA-CA10 feedback control, in a cylinder in which a measured SA-CA10 that is less than the target SA-CA10 is obtained, correction is executed that decreases the fuel injection amount to be used in the next cycle to thereby make the air-fuel ratio leaner and increase the measured SA-CA10. Conversely, in a cylinder in which a measured SA-CA10 that is greater than the target SA-CA10 is obtained, correction is executed that increases the fuel injection amount to be used in the next cycle to thereby make the air-fuel ratio richer and decrease the measured SA-CA10.

According to the SA-CA10 feedback control, by utilizing SA-CA10 that is a parameter that has a high correlation with the air-fuel ratio, the air-fuel ratio during lean-burn operation can be controlled to a target value (target air-fuel ratio). Consequently, by setting the target SA-CA10 to a value corresponding to an air-fuel ratio in the vicinity of a lean combustion limit, the air-fuel ratio can be controlled in the vicinity of the lean limit. By this means, low fuel consumption and low NOx emissions can be realized.

2. Feedback Control of Ignition Timing Utilizing CA50

The optimal ignition timing (so-called "MBT (minimum advance for the best torque) ignition timing") changes according to the air-fuel ratio. Therefore, if the air-fuel ratio changes as a result of the SA-CA10 feedback control, the MBT ignition timing will also change. On the other hand, CA50 at a time that the MBT ignition timing is obtained substantially does not change with respect to the air-fuel ratio in the lean air-fuel ratio region. Therefore it can be said that, by adopting CA50 at a time that the MBT ignition timing is obtained as a target CA50, and correcting the ignition timing so that a difference between the measured CA50 and the target CA50 is eliminated, the ignition timing at a time of lean-burn operation can be adjusted to the MBT ignition timing without being affected by a change in the air-fuel ratio as is described above. Therefore, according to the present embodiment a configuration is adopted that, during lean-burn operation, together with SA-CA10 feedback control, also executes feedback control that adjusts the ignition timing so that the measured CA50 comes close to the target CA50 (hereunder, referred to simply as "CA50 feedback control").

As shown in FIG. 3, in the CA50 feedback control, the target CA50 for making the ignition timing the MBT ignition timing is set to a value that is in accordance with the engine operating conditions (more specifically, the target air-fuel ratio, the engine speed and the intake air amount). Note that, the term "CA50 feedback control" used herein is not necessarily limited to control that controls so as to obtain the MBT ignition timing. That is, the CA50 feedback control can also be used when an ignition timing other than the MBT ignition timing is adopted as a target value, such as at a time of retarded combustion. In such a case, for example, in addition to the above described engine operating conditions, it is sufficient to set the target CA50 so as to change in accordance with a target ignition efficiency (index value indicating a degree of divergence of the target value from the MBT ignition timing).

The measured CA50 is calculated for each cycle in the respective cylinders. Further, in the CA50 feedback control, as one example, PI control is used to correct the ignition timing relative to the basic ignition timing so that a difference between the target CA50 and the measured CA50 is eliminated. The basic ignition timing is previously stored in the ECU 40 as a value that is in accordance with the engine operating conditions (mainly, the intake air amount and engine speed). In the PI control, using a difference between the target CA50 and the measured CA50 as well as a predetermined PI gain (proportional gain and integral gain), a correction amount of the ignition timing is calculated that is in accordance with the relevant difference as well as the size of an integrated value of the difference. A correction amount that is calculated for each cylinder is reflected in the basic ignition timing for the cylinder that is the object of adjustment. By this means, the ignition timing (target ignition timing) to be used in the next cycle at the relevant cylinder is adjusted (corrected) by the CA50 feedback control.

A value of the air-fuel ratio at the lean combustion limit changes upon receiving the influence of the ignition timing. More specifically, for example, when the ignition timing is being retarded relative to the MBT ignition timing, the value of the air-fuel ratio at the lean combustion limit moves to the rich side in comparison to when being controlled at the MBT ignition timing. If the SA-CA10 feedback control is executed without taking into consideration the above described influence of the ignition timing on the value of the air-fuel ratio at the lean combustion limit, there is a concern that misfiring will occur when the air-fuel ratio deflects to a value on the lean side due to the SA-CA10 feedback control. Therefore, according to the present embodiment, as a preferred embodiment of the SA-CA10 feedback control, a configuration is adopted in which SA-CA10 feedback control is performed only in a combustion cycle in which the CA50 feedback control is in a sufficiently converged state (that is, a state in which the ignition timing comes sufficiently close to the MBT ignition timing). Further, in order to favorably ensure the execution frequency of the SA-CA10 feedback control when performing the SA-CA10 feedback control in such a situation, according to the present embodiment a configuration is adopted in which the response speed of the CA50 feedback control is made higher than the response speed of the SA-CA10 feedback control. Such a setting of the response speed can be realized, for example, by making the PI gain to be used in the CA50 feedback control larger than the PI gain to be used in the SA-CA10 feedback control.

Note that, the SA-CA10 feedback control and the CA50 feedback control are executed for each cylinder in the above described form.

[Noise Detection Technique and Countermeasure when Noise is Detected in the Embodiment]

(Influence of Noise on Measured Data for MFB)

Figure 5:
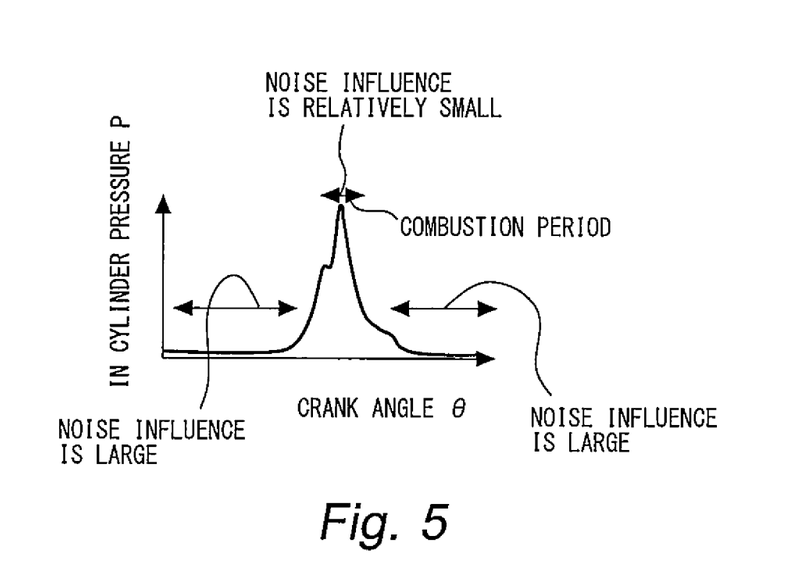
FIG. 5 is a P-θ diagram for describing differences in the degree of influence of noise with regard to respective locations in an in-cylinder pressure waveform during a single combustion cycle.

FIG. 5 is a P-θ diagram for describing differences in the degree of influence of noise with respect to respective locations of an in-cylinder pressure waveform during a single combustion cycle. Noise may sometimes be superimposed on an output signal of the in-cylinder pressure sensor 30 due to a variety of factors. However, as shown in FIG. 5, in the combustion period (CA0 to CA100) the influence of noise with respect to a measured waveform of the in-cylinder pressure during a single combustion cycle decreases in comparison to crank angle periods that are before and after the combustion period. The reason is that, in the combustion period and the vicinity thereof, the output value of the in-cylinder pressure sensor 30 is relatively large, and as a result the S/N ratio that is a ratio between the signal amount (signal) and noise amount (noise) increases. Furthermore, measured data for MFB that is calculated based on the output of the in-cylinder pressure sensor 30 is affected in the following manner by noise that is superimposed on an output signal of the in-cylinder pressure sensor 30.

Because MFB data in a combustion period is based on high-pressure in-cylinder pressure data with respect to which the degree of influence of noise is low, it can be said that the MFB data in a combustion period is less susceptible to the influence of noise in comparison to measured data for MFB in crank angle periods before and after a combustion period. Furthermore, the following can be said in relation to the influence of noise with respect to a measured value of the specified fraction combustion point CAα that is calculated based on measured data for MFB. That is, a waveform of MFB data has a characteristic such that the waveform rises rectilinearly in the main combustion period (from CA10 to CA90). Therefore, it can be said that, fundamentally, it is difficult for an error due to noise to arise at the specified fraction combustion point CAα within the main combustion period. However, because of being affected by the influence of noise that is superimposed in the crank angle periods before and after the combustion period, an error that is caused by noise is liable to arise at the combustion starting point CA0 and the combustion end point CA100 that are locations at which the waveform of MFB data bends as well as at combustion points in the vicinity of the combustion starting and ending points CA0 and CA100 (from around CA0 to CA10, and from around CA90 to CA100) in comparison to other combustion points such as the combustion center of gravity point (CA50) on the center side of the combustion period.

Figure 6:
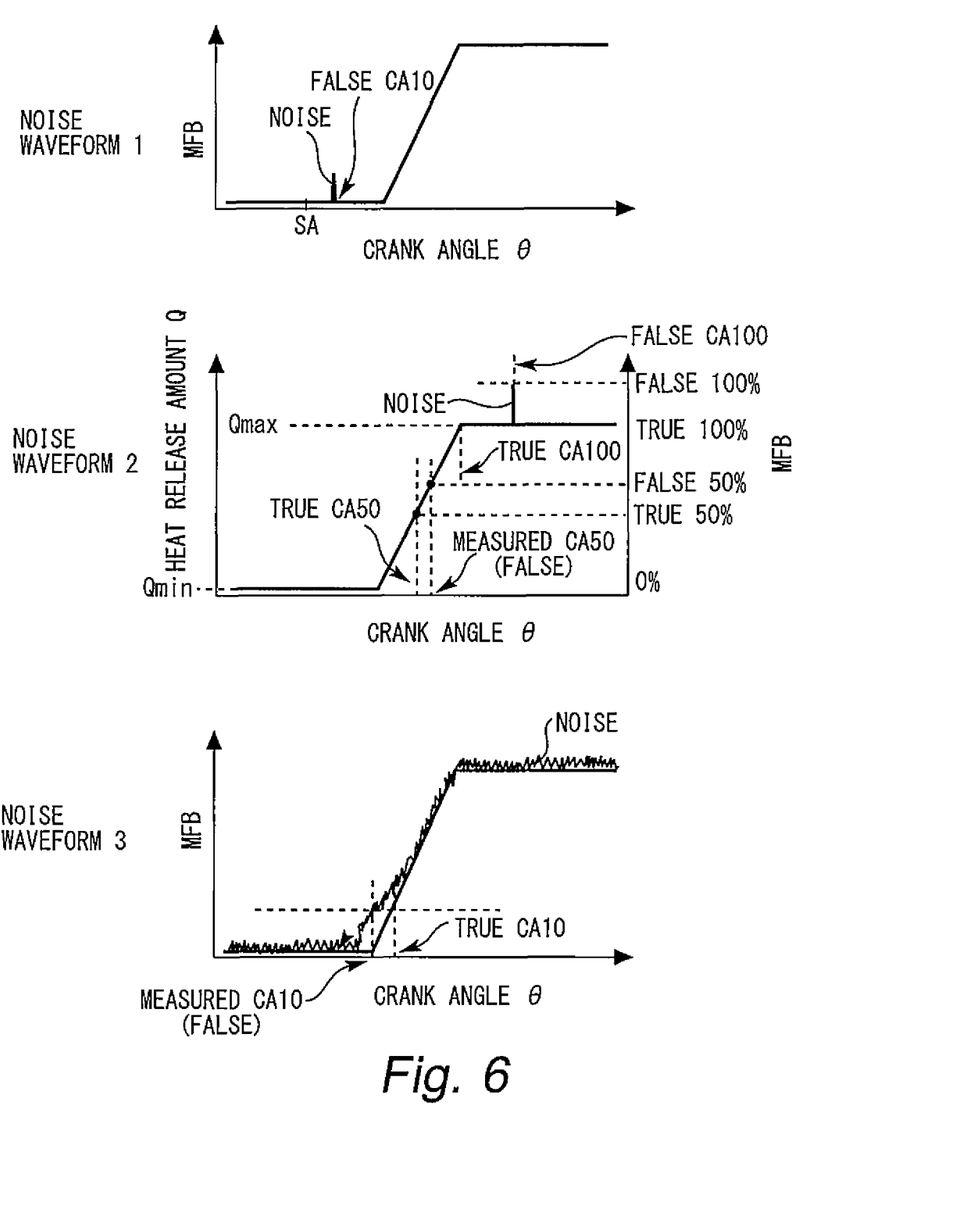
FIG. 6 is a view for describing kinds of noise that can be superimposed on a waveform of MFB data, and problems caused by superimposition of noise.

FIG. 6 is a view for describing kinds of noise that can be superimposed on a waveform of MFB data, and problems that are caused by the superimposition of noise. A noise waveform 1 shown in FIG. 6 schematically illustrates a waveform of MFB data that is based on in-cylinder pressure data in which a large amount of noise is superimposed in a spike shape at a crank angle timing that is after the ignition timing SA in a crank angle period before the combustion period. If it is assumed that a waveform of measured data for MFB acquired during execution of the above described SA-CA10 feedback control is the noise waveform 1, there is the possibility that a crank angle in the vicinity of the data at which the spike-shaped noise is superimposed will be erroneously calculated as CA10.

A noise waveform 2 shown in FIG. 6 schematically illustrates a waveform of heat release amount data that is based on in-cylinder pressure data in which a large amount of noise is superimposed in a spike shape in a crank angle period after a combustion period. The following problem arises when MFB data is calculated utilizing heat release amount data in which noise is superimposed in this manner. That is, there is a possibility that a value of the heat release amount data at the crank angle timing at which noise is superimposed will be erroneously recognized as a maximum heat release amount Qmax. This means that heat release amount data at which MFB becomes 100% will be erroneously determined. Consequently, an error will arise in calculation of CA100. Thus, an error caused by noise is liable to arise at CA100 as well as combustion points in the vicinity thereof due to receiving the influence of noise that is superimposed in a crank angle period after the combustion period. Although the influence of noise that is superimposed in the form shown in the noise waveform 2 decreases as the position of the relevant combustion point is separated on the CA0 side from CA100, when the maximum heat release amount Qmax that serves as a basis for calculating MFB is erroneously determined, this causes an error to arise in the values of other combustion points also. More specifically, as also shown in the noise waveform 2 in FIG. 6, an error also arises at combustion points in the vicinity of the center of the combustion period, such as CA50, which are combustion points that, originally, it is difficult for the influence of noise to directly affect.

A noise waveform 3 shown in FIG. 6 schematically illustrates a waveform of MFB data that is based on in-cylinder pressure data in which the same level of noise is uniformly superimposed with respect to all of a combustion period and crank angle periods before and after the combustion period. Even when noise is superimposed over all of the combustion period and the crank angle periods before and after the combustion period in this manner, as long as the level of the superimposed noise is small, it can be said that even if the MFB data in which noise is superimposed is used for control, the control will not be affected thereby. However, the following problem arises when noise of a comparatively large level such as in the noise waveform 3 is superimposed over a wide range. That is, because an output value of the in-cylinder pressure sensor is a relative pressure, when performing combustion analysis such as calculating MFB data based on in-cylinder pressure data, prior to the combustion analysis a correction (absolute pressure correction) is generally performed that converts the output value of the in-cylinder pressure to an absolute pressure. Since the processing for the absolute pressure correction is known, a detailed description thereof is omitted herein. In the absolute pressure correction, in-cylinder pressure data at a predetermined two crank angles during the crank angle period before the combustion period is used. When noise is superimposed in the manner shown in noise waveform 3, an error is generated in the in-cylinder pressure data for the aforementioned two points that is used for the absolute pressure correction, and hence an error also arises in the absolute pressure correction amount. Such an error in the absolute pressure correction amount is, for example, an error applied to the heat release amount data that is an error to the effect that a timing at which the heat release amount Q rises is earlier than the true timing. As a result, as also shown in the noise waveform in FIG. 6, a value at a combustion point in an initial stage of combustion, such as CA10, deviates relative to the true value. Further, an error in an absolute pressure correction amount may also affect a combustion point in the vicinity of the combustion end point CA100, such as CA90, and not just a combustion point in an initial stage of combustion, such as CA10.

(Noise Detection Techniques)

As illustrated by way of example referring to FIG. 6, the kind of noise that can be superimposed on an output signal of the in-cylinder pressure sensor 30 is not always the same. Further, when various usage environments of the internal combustion engine 10 are supposed, it is difficult to ascertain in advance when and in what form noise that has an influence on engine control will be superimposed on an output signal. However, in the case of performing the above described SA-CA10 feedback control and CA50 feedback control based on the output of the in-cylinder pressure sensor 30, it is preferable that it is possible to appropriately detect that noise is superimposed on measured data for MFB, and that an appropriate countermeasure is taken when noise is detected. Therefore, according to the present embodiment, noise that is superimposed on measured data for MFB is detected by the following techniques.

1. Noise detection technique when engine operating conditions are steady (more specifically, a case where engine operating conditions stay continuously in a single operating region; hereunder also referred to as "during steady operation")

Figure 7:
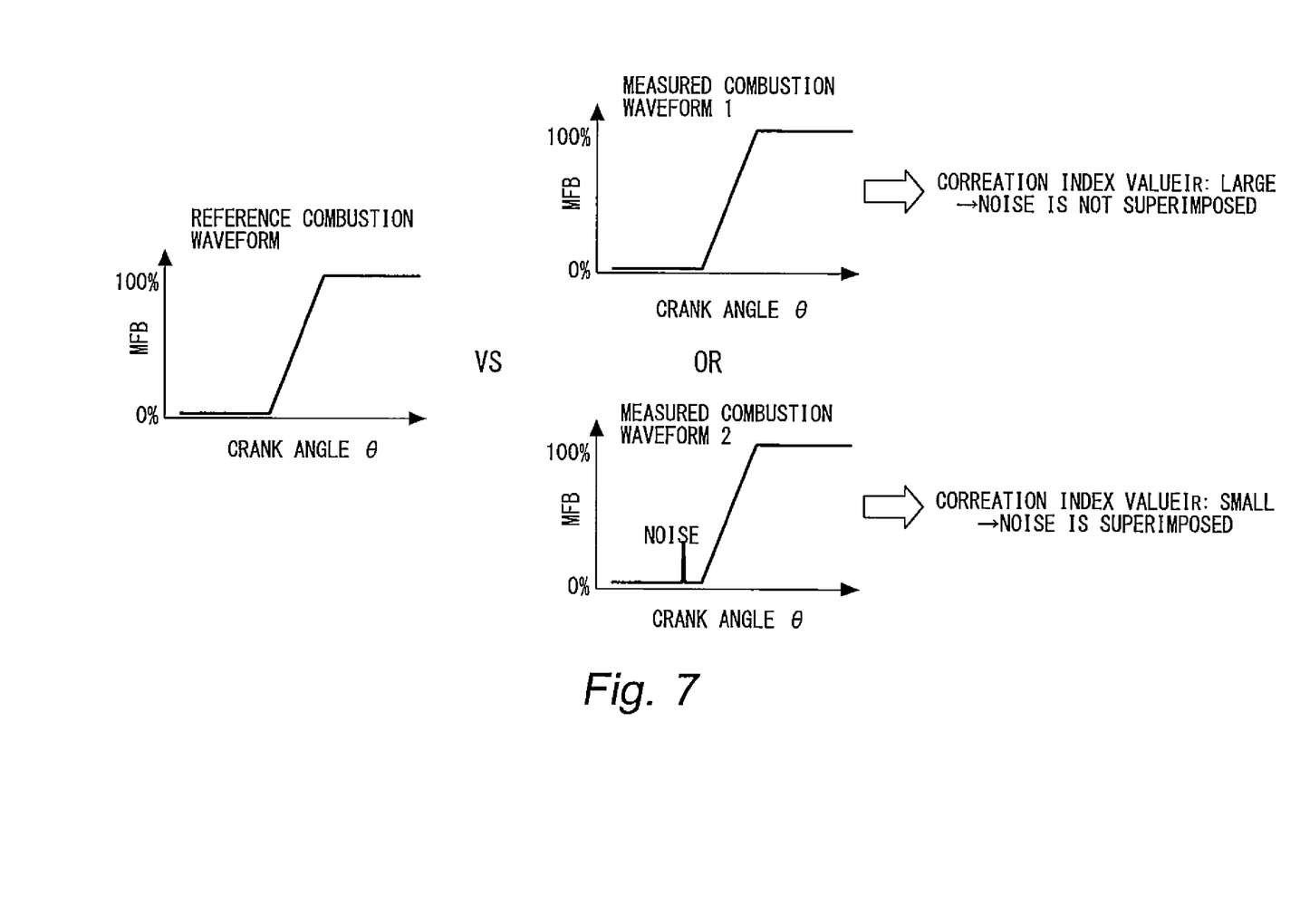
FIG. 7 is a view for describing a noise detection technique (when engine operating conditions are steady) in an embodiment of the present invention.

FIG. 7 is a view for describing a noise detection technique (during steady operation) in the embodiment of the present invention. A reference combustion waveform shown in FIG. 7 schematically represents a waveform of reference data for MFB (that is, the ideal MFB data) that is based on engine operating conditions. A measured combustion waveform 1 and a measured combustion waveform 2 shown in FIG. 7 each schematically represent a waveform of measured data for MFB. More specifically, the measured combustion waveform 1 shows an example when noise is not superimposed, while the measured combustion waveform 2 shows an example when spike-shaped noise is superimposed during a crank angle period before the combustion period (CA0 to CA100).

In the present embodiment, in order to detect noise that is superimposed on measured data for MFB, a "correlation index value $I_{RA}$" that shows a degree of correlation between the reference data for MFB and the measured data is determined. In the present embodiment, a cross-correlation coefficient is used as a preferable technique for calculating the correlation index value $I_{RA}$. Calculation of a cross-correlation coefficient $R_{ST}$ during steady operation that uses a cross-correlation function is performed utilizing the following equation (4).

[Expression 2]

$$R_{ST} = \Sigma f_{a-b}(\theta) g_{a-b}(\tau\theta - \theta) \qquad (4)$$

Where, in the above equation (4), $\theta$ represents a crank angle. Further, $\tau\theta$ is a variable that represents a relative deviation in a crank angle axis direction with respect to two waveforms that are objects for evaluation of the degree of correlation (according to the present embodiment, a waveform of reference data for MFB and a waveform of measured data for MFB). The function $f_{a-b}(\theta)$ corresponds to reference data for MFB that is a set of discrete values that exists for each predetermined crank angle. The function $g_{a-b}(\tau\theta - \theta)$ corresponds to measured data for MFB that, likewise, is a set of discrete values. More specifically, (a~b) indicates a section on the crank angle axis in which these functions $f_{a-b}(\theta)$ and $g_{a-b}(\tau\theta - \theta)$ are respectively defined. The relevant section (a~b) corresponds to a crank angle period (hereunder, referred to as "calculation period $\alpha$") in which reference data and measured data exist that are objects for calculation of the cross-correlation coefficient $R_{ST}$ (in other words, objects for evaluation of the degree of correlation) in the reference data and measured data for MFB. In the present embodiment, the calculation period $\alpha$ is taken as a period from the ignition timing until the opening timing (EVO) of the exhaust valve 22. Note that, when measured values of the specified fraction combustion points CA$\alpha$ (according to the present embodiment, CA10 and CA50) that are used in the engine control are not included in the measured data for MFB that is calculated based on measured data of the in-cylinder pressure, a configuration may be adopted in which a relevant measured value is determined by interpolation based on adjacent measured data, and after also determining a value on the reference data side that serves as a counterpart in a pair with the measured value, the pair of values are included in the objects for evaluating the degree of correlation.

Performance of a convolution operation using equation (4) is accompanied by an operation that, by varying the variable $\tau\theta$ within a predetermined range, consecutively calculates the cross-correlation coefficient $R_{ST}$ while causing the entire waveform of the measured data for MFB within the calculation period ($\alpha$) to move little by little in the crank angle direction (horizontal axis direction of the combustion waveform shown in FIG. 7) while keeping the waveform of the reference data for MFB fixed. A maximum value $R_{ST\_max}$ of the cross-correlation coefficient $R_{ST}$ in the course of this operation corresponds to the cross-correlation coefficient $R_{ST}$ at a time that the two waveforms are closest to each other overall, and can be expressed as shown in the following equation (5). The correlation index value $I_{RA}$ used in the present embodiment is not the maximum value $R_{ST\_max}$ itself, but rather is a value obtained by performing predetermined normalization processing on the cross-correlation coefficient $R_{ST}$. The term "normalization processing" used here refers to processing that is defined so that the maximum value $R_{ST\_max}$ exhibits a value of 1 at a time that the two waveforms (waveform of reference data for MFB and waveform of measured data for MFB) are completely matching. Since this processing is known, a detailed description thereof is omitted here.

[Expression 3]

$$R_{ST\_max} = \max(R_{ST}) = \max(\Sigma f_{a-b}(\theta) g_{a-b}(\tau_\theta - \theta)) \qquad (5)$$

The correlation index value $I_{RA}$ calculated by the above described calculation processing becomes 1 (maximum) when the two waveforms completely match, and progressively approaches zero as the degree of correlation between the two waveforms decreases. Note that, when the correlation index value $I_{RA}$ exhibits a minus value, there is a negative correlation between the two waveforms, and the correlation index value $I_{RA}$ exhibits a value of −1 when the two waveforms are completely inverted relative to each other. Accordingly, the degree of correlation between reference data and measured data for MFB can be ascertained on the basis of the correlation index value $I_{RA}$ that is obtained as described above.

In the example illustrated in FIG. 7, in a case of the measured combustion waveform 1 in which noise is not superimposed, the correlation index value $I_{RA}$ becomes a large value (a value close to 1). On the other hand, in a case of the measured combustion waveform 2 in which spike-shaped noise is superimposed at a single location, the correlation index value $I_{RA}$ becomes a small value relative to the value in the case of the measured combustion waveform 1. A situation in which the correlation index value $I_{RA}$ becomes a small value due to superimposition of noise is not limited to a case where spike-shaped noise is superimposed at a single location, and similarly applies when continual noise is superimposed as in the noise waveform 3 shown in FIG. 6. Further, the correlation index value $I_{RA}$ decreases as the level of noise that is superimposed increases. Therefore, by previously setting a determination value $I_{th}$ (positive value), a determination as to whether or not noise that exceeds a certain level is superimposed on measured data for MFB can be made based on the size of the correlation index value $I_{RA}$.

2. Noise detection technique when engine operating conditions are transient (more specifically, a case where engine operating conditions transition between operating regions; hereunder also referred to as "during transient operation")

Figure 8:
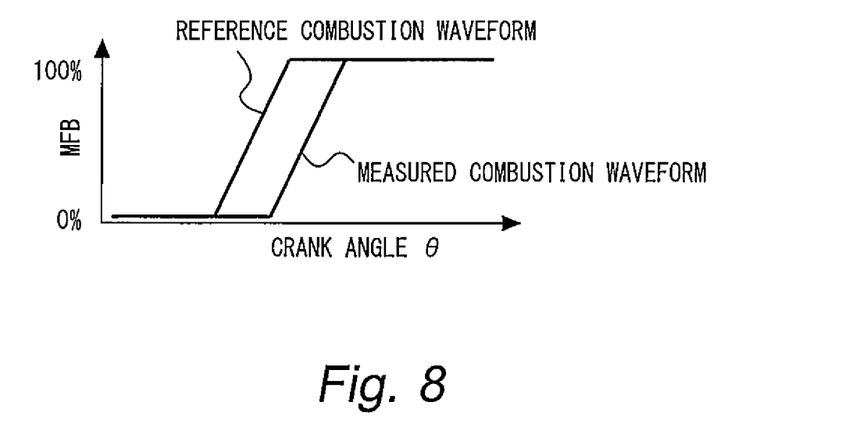
FIG. 8 is a view in which a waveform of reference data for MFB and a waveform of measured data for MFB when engine operating conditions are transient are schematically represented.

FIG. 8 is a view in which a waveform of reference data for MFB and a waveform of measured data for MFB during transient operation are schematically represented. As shown in FIG. 8, during transient operation, a divergence between the two waveforms (waveform of reference data for MFB and waveform of measured data for MFB) is liable to become large irrespective of whether or not noise is superimposed. The reason is that, although a cause of a divergence between the two waveforms can be easily narrowed down to superimposition of noise during steady operation (that is, during non-transient operation), during transient operation there are large combustion fluctuations, and it is difficult to distinguish whether the aforementioned divergence is due to the superimposition of noise or is due to combustion fluctuations. The correlation index value $I_{RA}$ decreases as the divergence between the two waveforms increases. Therefore, when noise detection that uses the correlation index value $I_{RA}$ is applied during transient operation, there is a risk that, even though noise is not actually superimposed on the measured data for MFB, an erroneous determination that noise is detected will be made.

Therefore, in the present embodiment, during transient operation a "correlation index value $I_{AA}$" is determined that shows a degree of correlation between a waveform of measured data for MFB (in the following description, for convenience, also referred to as "current data") and a waveform of measured data for MFB immediately prior thereto (in the following description, for convenience, also referred to as "immediately preceding past data"). The term waveform of "immediately preceding past data" referred to herein includes not only a waveform of measured data for MFB that is obtained in the same cylinder in a combustion cycle that is one cycle prior to the combustion cycle in which the waveform of the current data is obtained, but also includes a waveform of measured data for MFB that is obtained in a combustion cycle of another cylinder during a period from the relevant combustion cycle that is one cycle prior to the combustion cycle until the combustion cycle in which the waveform of the current data is obtained. For example, when the internal combustion engine 10 is a four-cylinder engine (firing order is: first cylinder→third cylinder→fourth cylinder→second cylinder) and a combustion cycle in which the waveform of the current data is obtained is a combustion cycle of the first cylinder, the term waveform of "immediately preceding past data" includes a waveform of measured data for MFB obtained in a combustion cycle of the first cylinder that is one cycle prior to the combustion cycle in which the waveform of the relevant current data is obtained, and measured data for MFB that is obtained in the combustion cycles of the second cylinder, third cylinder and fourth cylinder that occur after the time of the combustion cycle of the first cylinder that is one cycle prior to the combustion cycle in which the waveform of the relevant current data is obtained.

Figure 9:
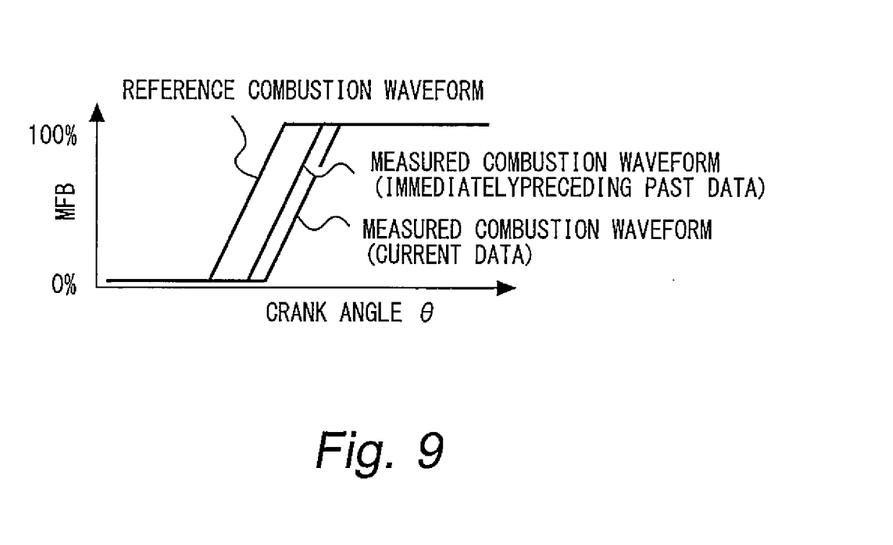
FIG. 9 is a view in which a waveform of reference data for MFB, a waveform of measured data for MFB and a waveform of measured data for MFB immediately prior thereto when engine operating conditions are transient are schematically represented.

FIG. 9 is a view in which a waveform of reference data for MFB, a waveform of current data and a waveform of immediately preceding past data during transient operation are schematically represented. As shown in FIG. 9, in the case of immediately preceding past data, it can be estimated that combustion fluctuation conditions at a time of data acquisition are closer to the current data than the reference data. Accordingly, if immediately preceding past data is used, combustion fluctuations can be eliminated from the causes of the divergence described above, and the cause of a divergence can be narrowed down to superimposition of noise. Note that, it is estimated that the reason the aforementioned combustion fluctuation conditions become closer is that the combustion fluctuations are between contiguous combustion cycles of the same cylinder. Further, in the case of data for two different cylinders, it is estimated that the nearer the cylinders in which the combustion cycles occur are to each other in the firing order, the closer the aforementioned combustion fluctuation conditions become. Therefore, it is more desirable that the waveform of immediately preceding past data is a waveform of measured data for MFB that is obtained in a combustion cycle of the same cylinder that immediately precedes the combustion cycle in which the waveform of the current data is obtained. Alternatively, it is more desirable that the waveform of immediately preceding past data is a waveform of measured data for MFB that is obtained in a combustion cycle of another cylinder which immediately precedes, in the firing order, the cylinder in whose combustion cycle the waveform of the current data is obtained.

Similarly to the technique for calculating the correlation index value $I_{RA}$, a cross-correlation function is used in the technique for calculating the correlation index value $I_{AA}$. Calculation of a cross-correlation coefficient $R_{TR}$ during transient operation using a cross-correlation function is performed utilizing the following equation (6).

[Expression 4]

$$R_{TR} = \Sigma g_{a\sim b}((\tau_\theta - \theta) h_{a\sim b}(\tau_\theta - \theta)) \quad (6)$$

Where, in the above equation (6), θ represents a crank angle. Further, τθ is a variable that represents a relative deviation in a crank angle axis direction with respect to two waveforms that are objects for evaluation of the degree of correlation (according to the present embodiment, a waveform of current data and a waveform of immediately preceding past data). The function $g_{a\sim b}(\tau\theta-\theta)$ corresponds to current data that is a set of discrete values that exists for each predetermined crank angle. The function $h_{a\sim b}(\tau\theta-\theta)$ corresponds to immediately preceding past data that, likewise, is a set of discrete values that exists for each predetermined crank angle. Here, (a~b) indicates a section on the crank angle axis in which these functions $g_{a\sim b}(\tau\theta-\theta)$ and $h_{a\sim b}(\tau\theta-\theta)$ are respectively defined. The relevant section (a~b) corresponds to the aforementioned calculation period α.

A maximum value $R_{TR\_max}$ of the cross-correlation coefficient $R_{TR}$ in the course of a convolution operation using equation (6) corresponds to the cross-correlation coefficient $R_{TR}$ at a time that the two waveforms are closest to each other overall, and can be expressed as shown in the following equation (7). The correlation index value $I_{AA}$ used in the present embodiment is not the maximum value $R_{TR\_max}$ itself, but rather is a value obtained by performing predetermined normalization processing on the cross-correlation coefficient $R_{TR}$. The term "normalization processing" used here refers to processing that is defined so that the maximum value $R_{TR\_max}$ exhibits a value of 1 at a time that the two waveforms (waveform of current data and waveform of immediately preceding past data) are completely matching.

[Expression 5]

$$R_{TR\_max} = \max(R_{TR}) = \max(\Sigma g_{a\sim b}(\tau_\theta - \theta) h_{a\sim b}(\tau_\theta - \theta)) \quad (7)$$

The correlation index value $I_{AA}$ calculated by the above described calculation processing becomes 1 (maximum) when the two waveforms completely match, and progressively approaches zero as the degree of correlation between the two waveforms decreases. Note that, when the correlation index value $I_{AA}$ exhibits a minus value, there is a negative correlation between the two waveforms, and the correlation index value $I_{AA}$ exhibits a value of −1 when the two waveforms are completely inverted relative to each other. Accordingly, the degree of correlation between current data and immediately preceding past data can be ascertained on the basis of the correlation index value $I_{AA}$ that is obtained as described above.

Similarly to the correlation index value $I_{RA}$, in a case in which noise is not superimposed on the current data, the correlation index value $I_{AA}$ becomes a large value (a value close to 1). Further, in a case in which noise is superimposed on the current data, the correlation index value $I_{AA}$ becomes a small value. Furthermore, a determination as to whether or not noise exceeding a certain level is superimposed on current data is performed by a comparison with the aforementioned determination value $I_{th}$.

(Countermeasure for Time that Noise is Detected)

When SA-CA10 feedback control and CA50 feedback control are continued without change irrespective of a fact that the feedback control is being performed under circumstances in which noise is superimposed on measured data for MFB, there is a possibility that high-accuracy feedback control cannot be performed. Therefore, in the present embodiment a configuration is adopted that determines whether or not noise is superimposed on measured data for MFB based on whether or not the correlation index value $I_{RA}$ (or correlation index value $I_{AA}$) that is calculated in each combustion cycle is less than the determination value $I_{th}$.

Furthermore, when the result of the aforementioned determination is affirmative, reflection of the measured CA10 and measured CA50 in the combustion cycle in which the correlation index value $I_{RA}$ that is the object of the affirmative determination is calculated in the SA-CA10 feedback control and the CA50 feedback control, respectively, is prohibited.

Note that, although according to the present embodiment a configuration is adopted in which, as described above, the maximum value of a value obtained by normalizing the cross-correlation coefficient R is used as the correlation index value $I_{RA}$ (or the correlation index value $I_{AA}$), a "correlation index value" in the present invention may also be the maximum value $R_{max}$ of the cross-correlation coefficient R that is not accompanied by predetermined normalization processing. However, the correlation index value (that is, the maximum value $R_{max}$) in a case that is not accompanied by normalization processing does not simply increase as the degree of correlation increases, but rather the relation described hereunder exists between the size of the maximum value $R_{max}$ and increases/decreases in the degree of correlation. That is, the degree of correlation increases as the maximum value $R_{max}$ increases, and the degree of correlation becomes highest (that is, the two waveforms completely match) when the maximum value $R_{max}$ becomes a certain value X. Further, when the maximum value $R_{max}$ increases to a value greater than the value X, the degree of correlation decreases as the maximum value $R_{max}$ increases. Accordingly, in the case of using the maximum value $R_{max}$ as it is as the "correlation index value" without normalization processing, a determination as to whether or not the "correlation index value" is less than a "determination value" can be performed by the following processing. That is, when the maximum value $R_{max}$ deviates from within a predetermined range that is centered on the value X, it can be determined that "the correlation index value is less than the determination value" and, conversely, when the maximum value $R_{max}$ falls within the aforementioned predetermined range, it can be determined that "the correlation index value is greater than or equal to the determination value".

(Specific Processing in Embodiment)

Figure 10:
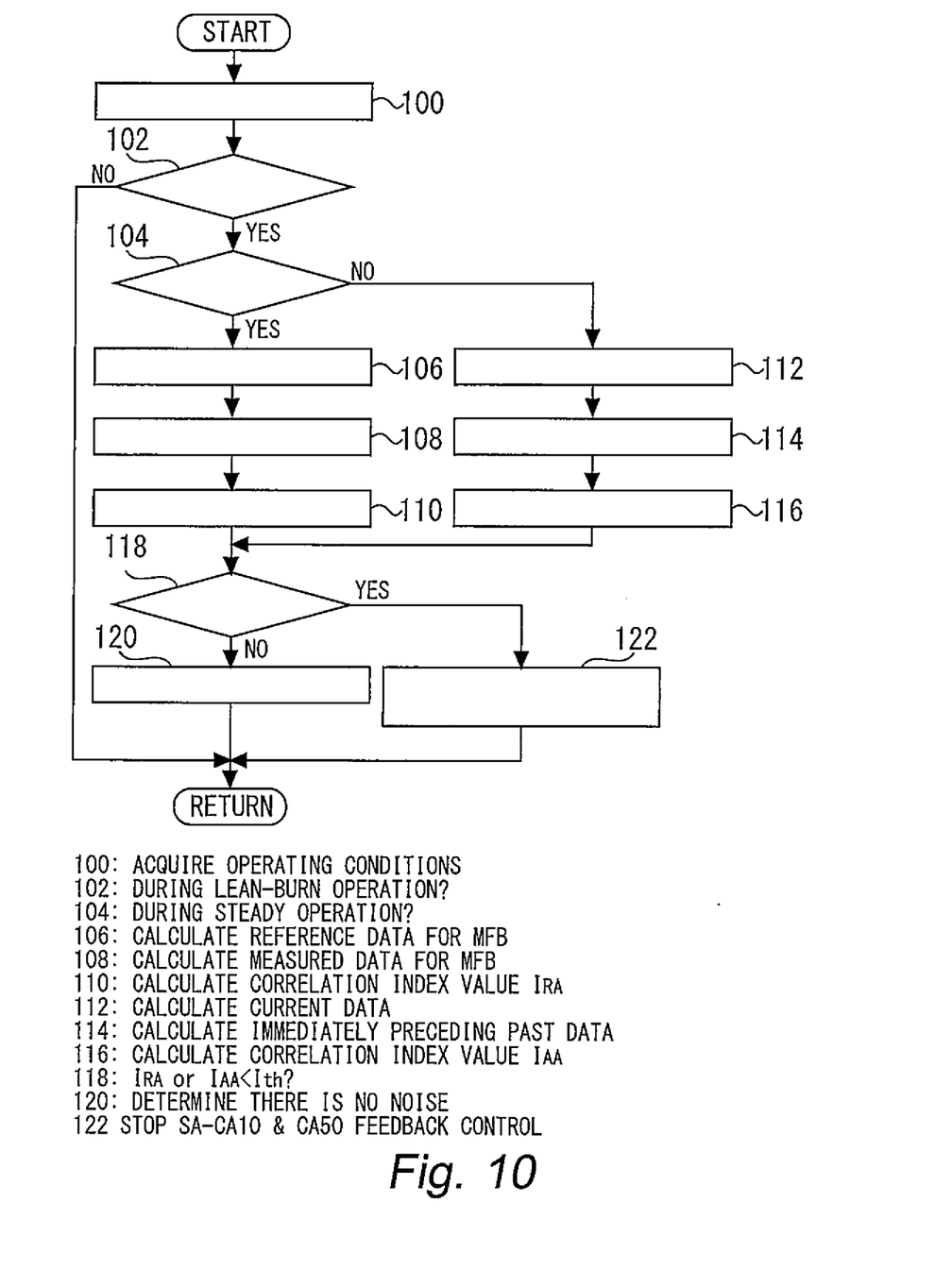
FIG. 10 is a flowchart illustrating a routine that an ECU executes in an embodiment of the present invention.

FIG. 10 is a flowchart illustrating a routine that the ECU 40 executes in the embodiment of the present invention. Note that the present routine is started at a timing at which the opening timing of the exhaust valve 22 has passed in each cylinder, and is repeatedly executed for each combustion cycle.

In the routine shown in FIG. 10, first, in step 100, the ECU 40 acquires the current engine operating conditions. The term "engine operating conditions" used here refers to mainly the engine speed, the intake air amount, the air-fuel ratio and the ignition timing. The engine speed is calculated using the crank angle sensor 42. The intake air amount is calculated using the air flow meter 44. The air-fuel ratio means a target air-fuel ratio, and can be calculated by referring to a map that defines the target air-fuel ratio in relation to the engine torque and the engine speed. The target air-fuel ratio is either of a predetermined lean air-fuel ratio that is used at a time of lean-burn operation and the theoretical air-fuel ratio. The ignition timing is an indicated value of an ignition timing that is used in the current combustion cycle (that is, a target ignition timing). When operating under the theoretical air-fuel ratio, the target ignition timing is determined by adopting the intake air amount and engine speed as principal parameters, while in the case of lean-burn operation a value in which the CA50 feedback control is reflected is used. For example, a target torque that is calculated based on the accelerator opening degree can be used as the engine torque.

Next, the ECU 40 proceeds to step 102 and determines whether or not the current operating region is a lean-burn operation region. Specifically, based on the target air-fuel ratio acquired in step 100, the ECU 40 determines whether the current operating region is a lean-burn operation region or is an operating region which uses the theoretical air-fuel ratio.

If the result of the determination in step 102 is negative, the processing of the current routine is promptly ended. In contrast, if the result of the determination in step 102 is affirmative, the ECU 40 proceeds to step 104. In step 104 the ECU 40 determines whether or not the engine operating conditions are steady. Specifically, the ECU 40 determines whether or not the engine operating conditions acquired in step 100 exist in the same operating region as the engine operating conditions acquired in step 100 of the previous routine. A single region that is obtained by dividing an operating region map in which engine operating conditions are comprehensively expressed, into sections for respective predetermined ranges is adopted as the basis for the aforementioned operating region.

If the result of the determination in step 104 is affirmative, the ECU 40 proceeds to step 106. In step 106, reference data for MFB is calculated based on the engine operating conditions acquired in step 100. The reference data for MFB can be calculated, for example, according to the following equation (8). The calculation of MFB data utilizing equation (8) is a known calculation using a Wiebe function, and hence a detailed description thereof is omitted here. As described in the foregoing, in the present embodiment the calculation period α for calculating the correlation index value $I_{RA}$ is a crank angle period from the ignition timing (target ignition timing) SA until the opening timing EVO of the exhaust valve 22. In the present step 106, reference data for MFB is calculated using equation (8) taking the calculation period α as an object.

[Expression 6]

$$MFB = \left[1 - \exp\left\{-c\left(\frac{\theta - \theta_{min}}{\theta_{max} - \theta_{min}}\right)^{m+1}\right\}\right] \quad (8)$$

Where, in the above equation (8), c represents a prescribed constant. Further, m represents a shape parameter which be determined by referring to a map in which the shape parameter m is previously defined in relation to the engine operating conditions (more specifically, the engine speed, the intake air amount, the air-fuel ratio and the ignition timing acquired in step 100).

Next, the ECU 40 proceeds to step 108. In step 108, measured data for MFB is calculated in accordance with the above described equation (3) based on measured data for the in-cylinder pressure that is acquired using the in-cylinder pressure sensor 30 in the current combustion cycle.

Next, the ECU 40 proceeds to step 110. In step 110, the correlation index value $I_{RA}$ is calculated using the above described equation (4) using the reference data and measured data for MFB calculated in steps 106 and 108, respectively, taking the calculation period α as the object.

On the other hand, if the result of the determination in step 104 is negative, the ECU 40 proceeds to step 112 since it can be determined that the engine operating conditions are transient. In step 112, measured data for MFB is calculated as current data in accordance with the above described equation (3) based on measured data for the in-cylinder pressure that is acquired using the in-cylinder pressure sensor 30 in the current combustion cycle.

Next, the ECU 40 proceeds to step 114. In step 114, measured data for MFB that is calculated in the previous routine is acquired as immediately preceding past data. Note that, because the present routine is started at a timing at which the opening timing of the exhaust valve 22 has passed in each cylinder, measured data for MFB that is acquired in step 112 corresponds to measured data for MFB that is obtained in the immediately preceding cylinder relative to the cylinder in which the current data is obtained.

Next, the ECU 40 proceeds to step 116. In step 116, the correlation index value $I_{AA}$ is calculated using the above described equation (6) using the current data and immediately preceding past data calculated in steps 112 and 114, respectively, taking the calculation period α as the object.

Next, the ECU 40 proceeds to step 118. In step 118, the ECU 40 determines whether or not the correlation index value $I_{RA}$ calculated in step 110 or the correlation index value $I_{AA}$ calculated in step 116 is less than the predetermined determination value $I_{th}$. The determination value $I_{th}$ used in the present step 118 is previously set as a value with which it can be determined whether noise of a certain level or more is superimposed.

When the result determined in step 118 is negative (more specifically, a case where $I_{RA} \geq I_{th}$ or $I_{AA} \geq I_{th}$), the ECU 40 proceeds to step 120. In step 120, the ECU 40 determines that noise of a certain level or more is not superimposed. On the other hand, when the result determined in step 112 is affirmative (more specifically, a case where $I_{RA} < I_{th}$ or $I_{AA} < I_{th}$), since it can be determined that noise of a certain level or more is superimposed, in step 122 the SA-CA10 feedback control and the CA50 feedback control are stopped.

As described in the foregoing, the SA-CA10 feedback control and CA50 feedback control are executed per cylinder during lean-burn operation, the results of these feedback controls (that is, a correction amount that is based on the relevant feedback control) is reflected in the next combustion cycle of the same cylinder. The processing in the present step 122 is, more specifically, processing that, by maintaining a correction amount for the fuel injection amount that is based on the SA-CA10 feedback control and a correction amount for the ignition timing that is based on the CA50 feedback control at the previous values thereof, respectively (more specifically, values that are calculated in the previous combustion cycle), and not reflecting the measured CA10 and the measured CA50 that are calculated in the current combustion cycle in the respective correction amounts, stops these feedback controls. Note that, PI control is utilized as an example of the aforementioned feedback control performed as described with reference to FIG. 3. That is, an I-term (integral term) that utilizes a cumulative difference between a target vale (target SA-CA10 or the like) and a measured value (measured SA-CA10 or the like) is included in these feedback controls. Accordingly, in a case of utilizing the aforementioned difference in a past combustion cycle in order to calculate an I-term when resuming feedback control, it is desirable to ensure that a value in a combustion cycle in which noise is detected is not included.

According to the processing illustrated in FIG. 10 that is described above, noise that is superimposed on measured data can be detected based on the correlation index value $I_{RA}$ or the correlation index value $I_{AA}$. When noise is detected, feedback control that utilizes measured data for MFB (that is, SA-CA10 feedback control and CA50 feedback control) is stopped. By this means, a measured CA10 or a measured CA50 in the current combustion cycle with respect to which there is a possibility that an error has arisen due to noise are prohibited from being reflected in the respective feedback controls. It is thereby possible to avoid a situation in which the accuracy of engine control deteriorates due to utilization of the aforementioned measured CA10 or measured CA50.

(Advantages of Cross-Correlation Function)

In the above described embodiment, a cross-correlation function is used to calculate the correlation index value $I_{RA}$ or the correlation index value $I_{AA}$. However, a technique for calculating a "correlation index value" in the present invention is not necessarily limited to a technique that uses a cross-correlation function. That is, the relevant calculation technique may be, for example, a technique that utilizes a value obtained by adding together the squares of differences (a so-called "residual sum of squares") between the measured data and reference data for MFB at the same crank angles when taking a predetermined calculation period as an object. In the case of the residual sum of squares, the value decreases as the degree of correlation increases. A "correlation index value" in the present invention is, more specifically, set as a value that becomes larger as the degree of correlation increases. Accordingly, in the case of utilizing the residual sum of squares, it is sufficient to use the "correlation index value" as an inverse number of the residual sum of squares.

Other Embodiments

In this connection, in the above described embodiment, when the correlation index value $I_{RA}$ (or correlation index value $I_{AA}$) is less than the determination value $I_{th}$, by maintaining the respective correction amounts of the SA-CA10 feedback control and the CA50 feedback control at the previous values thereof, reflection of the measured CA10 or measured CA50 in a combustion cycle in which the relevant correlation index value $I_{RA}$ (or correlation index value $I_{AA}$) is calculated in the respective feedback controls is prohibited. However, the manner of such prohibition is not limited to a case that maintains the previous values of the correction amount, and for example, a configuration may be adopted in which the respective correction amounts are set to zero. If the correction amounts are maintained at the previous values, although feeding back of the measured CA10 and the like in the current combustion cycle is stopped, adjustment of a fuel injection amount and the like is continued using a past feedback result is continued. On the other hand, if the correction amount is set to zero, utilization of a past feedback result is itself also prohibited. Further, a configuration may also be adopted that rather than prohibiting the aforementioned feedback controls, performs the feedback controls while lowering a feedback gain. This technique corresponds to an example in which a degree to which the measured CA10 and the like in the current combustion cycle is reflected in the SA-CA10 feedback control and the like is lowered in comparison to a case where the correlation index value $I_{RA}$ (or correlation index value $I_{AA}$) is equal to or greater than the determination value $I_{th}$.

Further, in the above described embodiment, the determination value $I_{th}$ that is common for the correlation index value $I_{RA}$ and the correlation index value $I_{AA}$ is used for the determination as to whether or not noise is superimposed on measured data for MFB. However, this determination value need not be a common value, and separate determination values may be used for the correlation index value $I_{RA}$ and the correlation index value $I_{AA}$.

Further, although SA-CA10 feedback control and CA50 feedback control are illustrated in the above described embodiment, "engine control that controls an actuator of an internal combustion engine based on a measured value at a specified fraction combustion point" in the present invention is not limited to the above described feedback control. That is, the specified fraction combustion point CAα can be used for determining torque fluctuations or misfiring of the internal combustion engine. Accordingly, control of a predetermined actuator that is performed upon receiving a result of the aforementioned determination is also included in the above described engine control. Further, the specified fraction combustion point CAα that is used as an object of "engine control" in the present invention is not limited to CA10 and CA50, and may be an arbitrary value that is selected from within a range from CA0 to CA100, and for example may be CA90 that is the 90% combustion point. In addition, for example, a combination of a plurality of specified fraction combustion points CAα may be used, such as CA10 to CA50 that is a crank angle period from CA10 to CA50.

Further, although in the above described embodiment an example is described in which the degree of correlation of MFB data is evaluated for each cylinder using a cross-correlation function, a configuration may also be adopted in which evaluation of the degree of correlation of MFB data is executed for an arbitrary representative cylinder as the object, and a predetermined countermeasure is implemented that takes all the cylinders as an object when noise is detected. However, in this case, evaluation of the degree of correlation of MFB data taking a cylinder other than the representative cylinder as an object is not performed. Therefore, in the case of performing an evaluation of the degree of correlation of MFB data taking a representative cylinder as an object, at a time of noise detection during transient operation as described above, measured data for MFB that is obtained in a combustion cycle of the representative cylinder is used as the "current data", and measured data for MFB that is obtained in a combustion cycle of the representative cylinder that is one cycle prior to the relevant combustion cycle is used as "immediately preceding past data".

Further, in the above described embodiment, an example is described in which the fuel injection amount is adjusted by means of the SA-CA10 feedback control. However, an object of adjustment by the SA-CA10 feedback control that is utilized for combustion control during lean-burn operation is not limited to a fuel injection amount, and may be an intake air amount or ignition energy. Note that, if the object of adjustment is the fuel injection amount or the intake air amount, the feedback control can be positioned as air-fuel ratio control. Further, a specified fraction combustion point CAα that is used in the present feedback control is not necessarily limited to CA10, and may be another combustion point. However, with regard to application to the present feedback control, it can be said that CA10 is better in comparison to the other combustion points for the following reasons. That is, when a combustion point within the main combustion period (CA10 to CA90) that is after CA10 is utilized, the crank angle period that is obtained will be affected to a large degree by parameters (EGR rate, intake air temperature and tumble ratio and the like) that affect combustion when the flame is spreading. That is, a crank angle period obtained in this case is not one that is focused purely on the air-fuel ratio, and is vulnerable to external disturbances. Further, as described above, an error is liable to arise at combustion points around the combustion starting point CA0 and the combustion end point CA100 due to the influence of noise that is superimposed on an output signal from the in-cylinder pressure sensor 30. The influence of such noise decreases as the combustion point moves away from the combustion starting point CA0 and the combustion end point CA100 in the direction of the center side of the combustion period. In consideration of these points, it can be said that CA10 is best.

Furthermore, in the above described embodiment, a configuration is adopted in which, at a time of lean-burn operation accompanied by implementation of SA-CA10 feedback control and CA50 feedback control, evaluation of the degree of correlation of MFB data is performed based on the correlation index value $I_{RA}$ (or correlation index value $I_{AA}$). However, on the premise that engine control based on the specified fraction combustion point CAα is being performed, the relevant evaluation is not limited to a time of lean-burn operation, and for example a configuration may be adopted in which the relevant evaluation in performed at a time of operation during combustion at the theoretical air-fuel ratio.

The invention claimed is:

1. A control device for an internal combustion engine, comprising:
   an in-cylinder pressure sensor that is configured to detect an in-cylinder pressure;
   a crank angle sensor that is configured to detect a crank angle; and
   a control unit that is configured to:
   calculate measured data for mass fraction burned that is synchronized with a crank angle, based on an in-cylinder pressure that is detected by the in-cylinder pressure sensor and a crank angle that is detected by the crank angle sensor;
   execute engine control in which a measured value at a specified fraction combustion point that is a crank angle at a time that mass fraction burned becomes a specified fraction is calculated based on measured data for mass fraction burned and an actuator of the internal combustion engine is controlled based on the measured value at the specified fraction combustion point;
   when operating conditions of the internal combustion engine are transient, calculate a correlation index value showing a degree of correlation between current data of the measured data for mass fraction burned and immediately preceding past data relative to the current data as a transition-time index value; and
   when the operating conditions are non-transient, calculate a correlation index value showing a degree of correlation between the current data and reference data for mass fraction burned that is based on the operating conditions as a non-transition-time index value,
   wherein the control unit is also configured to:
   when the transition-time index value is less than a determination value therefor, prohibit reflection of a measured value at a specified fraction combustion point in a combustion cycle in which the current data for mass fraction burned is calculated in the engine control, or lower a degree to which the measured value is reflected in the engine control in comparison to a case where the transition-time index value is equal to or greater than a determination value therefor; and
   when the non-transition-time index value is less than a determination value therefor, prohibit reflection of a measured value at a specified fraction combustion point in a combustion cycle in which the current data for mass fraction burned is calculated in the engine control, or lower a degree to which the measured value is reflected in the engine control in comparison to a case where the non-transition-time index value is equal to or greater than a determination value therefor.

2. The control device for an internal combustion engine according to claim 1,
   wherein the control unit is also configured to calculate the transition-time index value by using measured data for mass fraction burned that is calculated in a combustion cycle of a same cylinder that is one cycle prior to a combustion cycle in which the current data for mass fraction burned is calculated as the immediately preceding past data.

3. The control device for an internal combustion engine according to claim 1,
   wherein the in-cylinder pressure sensor is configured to detect an in-cylinder pressure for each cylinder of a plurality of cylinders,
   wherein the control unit is also configured to calculate the transition-time index value by using measured data for mass fraction burned that is calculated in a combustion cycle of another cylinder during a period from a combustion cycle of a same cylinder that is one cycle prior to a combustion cycle in which the current data for mass fraction burned is calculated until a combustion cycle in which the current data for mass fraction burned is calculated as the immediately preceding past data.

4. The control device for an internal combustion engine according to claim 3,
   wherein the other cylinder is a cylinder that, in a firing order, is positioned one place before a cylinder in whose combustion cycle the current data for mass fraction burned is calculated.

* * * * *